(12) United States Patent
Bai et al.

(10) Patent No.: US 10,972,864 B2
(45) Date of Patent: Apr. 6, 2021

(54) INFORMATION RECOMMENDATION METHOD, APPARATUS, DEVICE AND COMPUTER READABLE STORAGE MEDIUM

(71) Applicant: Beijing Baidu Netcom Science Technology Co., Ltd., Beijing (CN)

(72) Inventors: Guocai Bai, Beijing (CN); Jingsi Zhu, Beijing (CN); Zhilei Jiang, Beijing (CN); Jingbo Fan, Beijing (CN); Xiying Wang, Beijing (CN); Chengwei Feng, Beijing (CN); Guochuan Deng, Beijing (CN); Lisha Chen, Beijing (CN); Jiajing Fu, Beijing (CN); Pengcheng Song, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 0 days.

(21) Appl. No.: 16/868,987

(22) Filed: May 7, 2020

(65) Prior Publication Data

US 2021/0006932 A1 Jan. 7, 2021

(30) Foreign Application Priority Data

Jul. 2, 2019 (CN) .......................... 201910589005.5

(51) Int. Cl.
*H04W 24/00* (2009.01)
*H04W 4/021* (2018.01)
(Continued)

(52) U.S. Cl.
CPC ........... *H04W 4/021* (2013.01); *H04W 4/023* (2013.01); *H04W 4/024* (2018.02); *H04W 4/027* (2013.01);
(Continued)

(58) Field of Classification Search
CPC ..... H04W 4/021; H04W 4/024; H04W 4/027; H04W 4/023; H04W 88/02; H04W 8/245; H04M 1/72519; H04M 1/72522
(Continued)

(56) References Cited

U.S. PATENT DOCUMENTS 10,132,932 B1 11/2018 McConville et al.
2013/0326137 A1 12/2013 Bilange et al.
(Continued)

FOREIGN PATENT DOCUMENTS

CN 104350769 A 2/2015
CN 106096785 A 11/2016
(Continued)

OTHER PUBLICATIONS

First Office Action issued in CN Patent Application No. 2019105890055 dated Jun. 28, 2020.
(Continued)

*Primary Examiner* — Danh C Le
(74) *Attorney, Agent, or Firm* — Dilworth IP, LLC

(57) ABSTRACT

Embodiments of the present disclosure provide an information recommendation method, apparatus, device and a computer readable storage medium. The method includes: acquiring positioning information of a mobile terminal of a user; determining multiple optional geo-fences based on the positioning information; and determining a pre-recommended geo-fence based on the positioning information and weight information of the acquired multiple optional geo-fences; and generating recommendation information of the pre-recommended geo-fence in case that a position corresponding to the positioning information falls within the range of the pre-recommended geo-fence. The embodiments of the present disclosure can improve the recommendation accuracy.

16 Claims, 5 Drawing Sheets

(51) Int. Cl.
  *H04W 4/024* (2018.01)
  *H04W 4/02* (2018.01)
  *H04M 1/724* (2021.01)
  *H04M 1/72403* (2021.01)

(52) U.S. Cl.
  CPC ........ *H04M 1/724* (2021.01); *H04M 1/72403* (2021.01)

(58) Field of Classification Search
  USPC .................. 455/456.3, 456.5, 550.1, 418
  See application file for complete search history.

(56) References Cited

U.S. PATENT DOCUMENTS

| | | | |
|---|---|---|---|
| 2015/0181016 A1* | 6/2015 | Jain | H04M 1/72572 455/456.4 |
| 2017/0267170 A1* | 9/2017 | Be | B60Q 9/00 |
| 2018/0020324 A1* | 1/2018 | Beauford | H04L 43/10 |
| 2018/0027370 A1* | 1/2018 | Austraat | H04L 67/10 455/456.1 |
| 2019/0147368 A1* | 5/2019 | Pinel | G08G 1/14 706/12 |
| 2019/0166464 A1* | 5/2019 | Quitoriano | H04W 4/20 |
| 2020/0025582 A1* | 1/2020 | Jeon | G01C 21/3461 |
| 2020/0045501 A1* | 2/2020 | Fox | G06Q 50/01 |
| 2020/0058013 A1* | 2/2020 | Carter | G06Q 20/204 |
| 2020/0137357 A1* | 4/2020 | Kapoustin | G06K 9/00255 |

FOREIGN PATENT DOCUMENTS

| | | |
|---|---|---|
| CN | 106161744 A | 11/2016 |
| CN | 107240156 A | 10/2017 |
| CN | 109284448 A | 1/2019 |

OTHER PUBLICATIONS

First Office Action in CN Patent Application No. 201910589005.5 dated Jun. 28, 2020.

\* cited by examiner

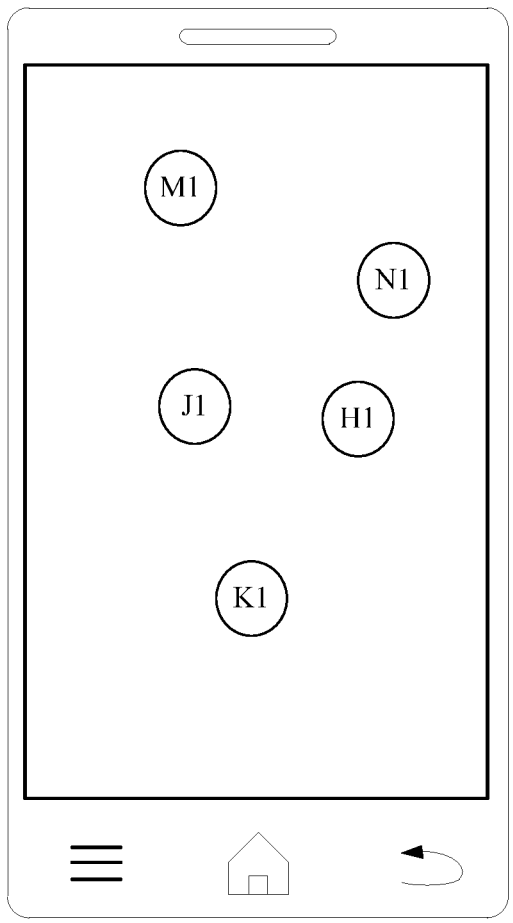

FIG. 7

| Displaying request information for an authorization of image collection by a camera of a mobile terminal | S801 |

| Acquiring the images captured by the camera, in response to passing, by the user via the mobile terminal, the authorization of image collection by the camera of the mobile terminal | S802 |

| Sending the images to a server such that the server trains a user position recognition model based on the images, so that the user position recognition model is capable of recognizing the current position of the user according to the images captured by the camera | S803 |

FIG. 8

INFORMATION RECOMMENDATION METHOD, APPARATUS, DEVICE AND COMPUTER READABLE STORAGE MEDIUM

CROSS-REFERENCE TO RELATED APPLICATION

This application claims priority to Chinese Patent Application No. 201910589005.5, filed on Jul. 2, 2019, which is hereby incorporated by reference in its entirety.

TECHNICAL FIELD

The present disclosure relates to the field of internet technologies and, in particular, to an information recommendation method, apparatus, device and a computer readable storage medium.

BACKGROUND

At present, when users are using a map software, the map software often makes recommendations with respect to surroundings or through taking the city as a scope according to their positioning information. However, these recommendations are recommended only based on the positioning information of the users, thus, there is often a problem that a user reach of delivered recommendation information is low, which leads to a low recommendation accuracy.

SUMMARY

An embodiment of the present disclosure provides a method, an apparatus, a device and a computer readable storage medium for recommending information, in order to improve the recommendation accuracy.

In a first aspect, an embodiment of the present disclosure provides an information recommendation method, including: acquiring positioning information of a mobile terminal of a user; determining multiple optional geo-fences based on the positioning information; determining a pre-recommended geo-fence based on the positioning information and weight information of the multiple acquired optional geo-fences; and generating recommendation information of the pre-recommended geo-fence in case that a position corresponding to the positioning information falls within a range of the pre-recommended geo-fence.

In a second aspect, an embodiment of the present disclosure provides an information recommendation apparatus, including: an acquiring module, configured to acquire positioning information of a mobile terminal of a user; a first determining module, configured to determine multiple optional geo-fences based on the positioning information; a second determining module, configured to determine a pre-recommended geo-fence based on the positioning information and weight information of the acquired multiple optional geo-fences; a generating module, configured to generate recommendation information of the pre-recommended geo-fence in case that a position corresponding to the positioning information falls within a range of the pre-recommended geo-fence.

In a third aspect, an embodiment of the present disclosure provides an information recommendation device, includes: one or more processor;
a memory, configured to store one or more programs;
a camera, configured to collect images;
an acceleration sensor, configured to collect an acceleration;
when the one or more processors execute the one or more programs, the one or more processors are enabled to implement the method according to the first aspect.

In a fourth aspect, an embodiment of the present disclosure provides a computer readable storage medium, which stores a computer program, the computer program implements the method according to the first aspect when executed by a processor.

The information recommendation method, apparatus, device and the computer readable storage medium provided by the embodiments of the present disclosure, acquire positioning information of a mobile terminal of a user; determine multiple geo-fences based on the positioning information; determine a pre-recommended geo-fence based on the positioning information and weight information of the acquired multiple optional geo-fences; and generate recommendation information of the pre-recommended geo-fence in case that a position corresponding to the positioning information falls within a range of the pre-recommended geo-fence. Since a determination of the pre-recommended geo-fence has considered about the weight information, and the recommendation information of the pre-recommended geo-fence is generated in case that the position corresponding to the positioning information of the user falls within the range of the pre-recommended geo-fence, and thus the recommendation information of the pre-recommended geo-fence can be exposed to a target user group more precisely, thereby improving the user reach (a ratio that the recommendation information of the pre-recommended geo-fence reaches the target user group). Therefore, the recommendation accuracy can be improved comparing to determining the pre-recommended geo-fence only based on the positioning information.

BRIEF DESCRIPTION OF DRAWINGS

FIG. 7 is a diagram of another application scenario corresponding to FIG. 6 provided by an embodiment of the present disclosure;

FIG. 8 is a flowchart of an information recommendation method provided by another embodiment of the present disclosure;

Figure 1:
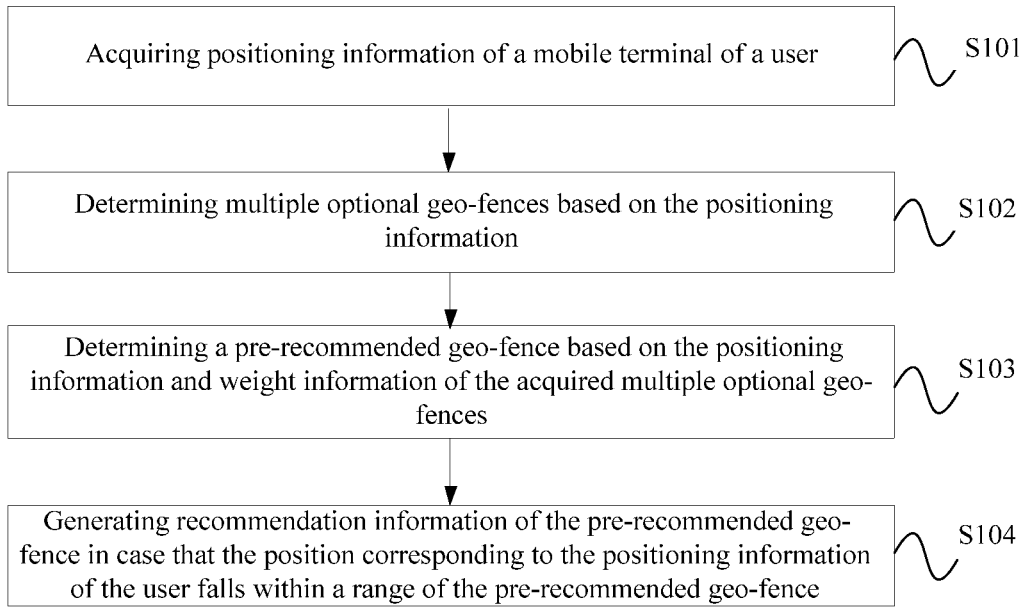
FIG. 1 is a flowchart of an information recommendation method provided by an embodiment of the present disclosure.

The above drawings have illustrated specific embodiments of the present disclosure, which will be described in more detail in the following. These drawings and descriptions are for the purpose of explaining a concept of the present disclosure to those skilled in the art with reference to the specific embodiments, and are not intended to limit the scope of the concept of the present disclosure through any ways.

DESCRIPTION OF EMBODIMENTS

The exemplary embodiments will be explained in detail herein, the examples of which are represented in the drawings. When the following description relates to the drawings, the same number in different drawings represents the identical or similar elements unless otherwise indicated. Implementations described in the following exemplary embodiments do not represent all the implementations consistent with the present disclosure. Otherwise, they are only examples of the apparatus and methods that described in detail in the appended claims and only consistent with some aspects of the present disclosure.

The information recommendation method provided by the following embodiments of the present disclosure may be applied in an instance related to the augmented reality (AR) in map software installed in a mobile terminal, but it does not limited to an AR application instance and may be any recommendation objects. In the following, technical solutions of the present disclosure and how the technical solutions of the present disclosure solve the above technical problem will be described in detail through specific embodiments by taking an example that a pre-recommended position, a pre-recommended geo-fence and a recommendation object are AR modules. The following several specific embodiments can be combined with each other, and the identical or similar concepts or procedures may not be repeated in some embodiments. The embodiments of the present disclosure will be described with reference to the drawings.

FIG. 1 is a flowchart of an information recommendation method provided by an embodiment of the present disclosure. The embodiment of the present disclosure provides an information recommendation method for solving the above technical problem of the prior art, the specific procedures of the method are as follows:

Step 101, acquiring positioning information of a mobile terminal of a user.

In the present embodiment, the mobile terminal may be a mobile terminal with the Global Positioning System (GPS), for example, a smart phone, an IPad. Specifically, the positioning information of the user may be acquired by positioning the mobile terminal via the GPS.

Step 102, determining multiple optional geo-fences based on the positioning information.

Specifically, the geo-fence refers to a virtual geographical boundary fenced by a virtual fence. For example, a certain attraction or a certain shopping mall may be taken as the geo-fence, and a certain experience area in the certain attraction or the certain shopping mall may also be determined as the optional geo-fence. In the embodiment of the present disclosure, the geo-fence can also be fenced according to popularity of a certain area, for example, an area is designated with a pre-estimated diameter, if the amount of users in the area is larger than a threshold value, then a range, which is determined according to the positioning information of the users in the area, is taken as an optional geo-fence.

In an implementation, the determining multiple optional geo-fences based on the positioning information may be: selecting the geo-fence closer to the user as the optional geo-fence. In a typical application scenario, for example, the user starts the map software in the mobile terminal, and starts the GPS function in the mobile terminal at the same time; when assuming that the attraction where the user located in has N geo-fences and the map software determines that geo-fences A, B and C are the closest geo-fences to the current position of the user based on the positioning information of the user, the geo-fences A, B and C are designated as the optional geo-fences.

Step 103, determining a pre-recommended geo-fence based on the positioning information and weight information of the acquired multiple optional geo-fences.

Specifically, the pre-recommended geo-fence is determined from the multiple optional geo-fences according to the positioning information of the mobile terminal of the user and the weight information of the multiple optional geo-fences and then showed on the mobile terminal so as to be recommended to the user. The weight information of the optional geo-fence can be used to represent a probability that the user selects the optional geo-fence.

In an implementation, determining the pre-recommended geo-fence based on the positioning information and the weight information of the acquired multiple optional geo-fences may be: based on a ratio of a distance between the current position of the user and the multiple optional geo-fences to the weight information, determining the optional geo-fence with ratio greater than a preset ratio as the pre-recommended geo-fence.

Continue to illustrate the above examples, assuming that the distances between the geo-fences A, B and C and the current position of the user are $L_A$, $L_B$ and $L_C$ respectively, and the weight information of the geo-fences A, B and C are $W_A$, $W_B$ and $W_C$ respectively, the ratio of $L_A$ to $W_A$ is $L_A/W_A$, the ratio of $L_B$ to $W_B$ is $L_B/W_B$, and the ration of $L_C$ to $W_C$ is $L_C/W_C$, when both of the $L_A/W_A$ and $L_B/W_B$ are greater than the preset ratio, then the geo-fences A and B are considered to be the pre-recommended geo-fences. Obviously, the pre-recommended geo-fence may be one, those skilled in the art can limit it according to practical requirements.

Step 104, generating recommendation information of the pre-recommended geo-fence in case that the position corresponding to the positioning information falls within a range of the pre-recommended geo-fence.

Specifically, the recommendation information of the pre-recommended geo-fence is generated in case that the position corresponding to the positioning information of the user falls within the range of the pre-recommended geo-fence. Furthermore, the recommendation information can be shown on the mobile terminal of the user so as to be recommended to the user, the user then can enter an AR scenario of the pre-recommended geo-fence when the user triggers the recommendation information.

The embodiment of the present disclosure acquires positioning information of a mobile terminal of a user, determines multiple optional geo-fences based on the positioning information, determines the pre-recommended geo-fence based on the positioning information and the weight information of the acquired multiple optional geo-fences, and generates the recommendation information of the pre-recommended geo-fence in case that the position corresponding to the positioning information falls within the range of the pre-recommended geo-fence. Since the determination of the pre-recommended geo-fence has considered about the weight information, and the recommendation information of the pre-recommended geo-fence is generated in case that the position corresponding to the positioning information of the user falls within the range of the pre-recommended geo-fence, and thus the recommendation information of the pre-recommended geo-fence can be exposed to the target user group more precisely, thereby improving the user reach of the user. Therefore, the recommendation accuracy can be improved comparing to determining the pre-recommended geo-fence only based on the positioning information.

In an implementation, after determining the pre-recommended geo-fence based on the positioning information and the weight information of the acquired multiple optional geo-fences, the method of the embodiment of the present disclosure further includes: generating guidance information for reaching the pre-recommended geo-fence from the position corresponding to the positioning information, in case that the position corresponding to the positioning information does not fall within the range of the pre-recommended geo-fence. Specifically, in case that the position corresponding to the positioning information of the user does not fall within the range of the pre-recommended geo-fence, the guidance information for reaching the pre-recommended geo-fence from the position corresponding to the positioning information can be generated based on the positioning information of the user and the position information of the pre-recommended geo-fence, to guide the user to the pre-recommended geo-fence, thereby increasing the user reach of the recommendation information of the pre-recommended geo-fence.

In an implementation, the guidance information includes first navigation information. In case that the position corresponding to the positioning information does not fall within the range of the pre-recommended geo-fence, generating guidance information for reaching the pre-recommended geo-fence from the position corresponding to the positioning information includes: generating the first navigation information for reaching the pre-recommended geo-fence from the position corresponding to the positioning information, in case that the position corresponding to the positioning information does not fall within the range of the pre-recommended geo-fence and the distance between the position corresponding to the positioning information and the pre-recommended geo-fence is greater than a distance threshold. For example, if the distance between the current position of the user and the pre-recommended geo-fence is 200 meters, and the distance threshold is 40 meters, then the first navigation information can be generated based on the current positioning information of the user and the position information of the pre-recommended geo-fence, and displayed on the mobile terminal (for example, displayed on the display page of the map software installed on the mobile terminal) of the user, thereby guiding the users to the pre-recommended geo-fence based on the first navigation information.

In an implementation, the guidance information includes instruction information. In case that the position corresponding to the positioning information does not fall within the range of the pre-recommended geo-fence, generating the guidance information for reaching the pre-recommended geo-fence from the position corresponding to the positioning information includes: generating the instruction information for reaching the pre-recommended geo-fence from the position corresponding to the positioning information in case that the position corresponding to the positioning information does not fall within the range of the pre-recommended geo-fence, and the distance between the position corresponding to the positioning information and the pre-recommended geo-fence is less than or equal to the distance threshold. For example, if the distance between the current position of the user and the pre-recommended geo-fence is 20 meters, and the distance threshold is 40 meters, then the instruction information can be generated based on the current positioning information of the user and the position information of the pre-recommended geo-fence, and displayed on the mobile terminal (for example, displayed on the display page of the map software installed on the mobile terminal) of the user, thereby guiding the user to walk to the recommended geo-fence according to the instruction information. The instruction information may be displayed on the display page of the map software in the form of a pop-up window of a landing page. The difference between the instruction information and the navigation information is that, the distance between the user and the pre-recommended geo-fence in the application scenario of the instruction information is very close, the pre-recommended geo-fence is basically within the sight of the user, and the user can understand the distance and orientation between himself and the pre-recommended geo-fence according to the instruction information in the illustration, and can walk directly to the geo-fence based on the instruction information.

In an implementation, the weight information of the optional geo-fence is determined according to popularity information and/or a favorite time period of the optional geo-fence. The popularity information of the geo-fence can be expressed by the amount of the users within the range of the geo-fence. The favorite time period of the geo-fence refers to a time period in which the geo-fence has a relatively high popularity. For example, a peak season of the attraction A is from June to August each year, then the favorite time period is from June to August each year. For another example, a restaurant B has a high popularity at 12:00-13:00 every day, then the 12:00-13:00 is the favorite time period every day. For another example, the shopping mall C has a high popularity at 19:00-22:00 every Friday night, and then the 19:00-22:00 every Friday night is the favorite time period. Obviously, the popularity information may also be expressed according to other information, and the present disclosure will not make a full introduction herein.

Figure 2:
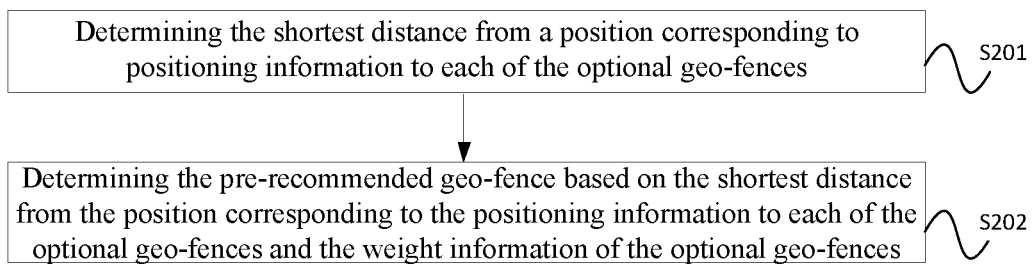
FIG. 2 is a flowchart of an information recommendation method provided by another embodiment of the present disclosure.

FIG. 2 is a flowchart of an information recommendation method provided by another embodiment of the present disclosure. On the basis of the above embodiment, the information recommendation method provided by the present embodiment specifically includes the following steps:

Step 201, determining a shortest distance from the position corresponding to positioning information to each of the optional geo-fences.

Specifically, the shortest distance from the position corresponding to the positioning information of a user to each of the optional geo-fences refers to the distance from a current position of the user to a surface of each of the optional geo-fences. In the calculation process, taking a coordinate point on a surface of each of the optional geo-fences respectively, and the distance from a current position of the user to a surface of each of the optional geo-fences can be converted into a point-to-point distance and used as the distance from the current position of the user to each of the optional geo-fences. Obviously, multiple coordinate points may also be taken on a surface of each of the optional geo-fences respectively, and then the distance from a current position of the user to a surface of each of the optional geo-fences can be converted into the distance between one point to multiple points and used as the distance from the current position of the user to multiple points on a surface of each of the optional geo-fences.

Step 202, determining the pre-recommended geo-fence based on the shortest distance from the position corresponding to the positioning information to each of the optional geo-fences and the weight information of the optional geo-fences.

In an implementation, determining the pre-recommended geo-fence based on the shortest distance from the position corresponding to the positioning information to each of the optional geo-fences and the weight information of the optional geo-fences includes: for each of the optional geo-fences, the distance between the position corresponding to the positioning information of the user and each of the optional geo-fences may be taken as a recommendation priority of the optional geo-fence; the weight information of each of the optional geo-fences may also be taken as the recommendation priority of the optional geo-fence; a ratio of the distance between the position corresponding to the positioning information of the user and each of the optional geo-fences to the weight information of the optional geo-fence may also be taken as the recommendation priority of the optional geo-fence.

In an implementation, for each of the optional geo-fences, if the shortest distance between the position corresponding to the positioning information of the user and each of the optional geo-fences is taken as the recommendation priority of the optional geo-fence, then the optional geo-fence corresponding to the lowest recommendation priority is taken as the pre-recommended geo-fence; if the weight information of each of the optional geo-fences is taken as the recommendation priority of the optional geo-fence, then the optional geo-fence corresponding to the highest recommendation priority is taken as the pre-recommended geo-fence; if the ratio of the distance between the position corresponding to the positioning information of the user and each of the optional geo-fences to the weight information of the optional geo-fence is taken as the recommendation priority, then the optional geo-fence corresponding to the lowest recommendation priority is taken as the pre-recommended geo-fence.

Figure 3:
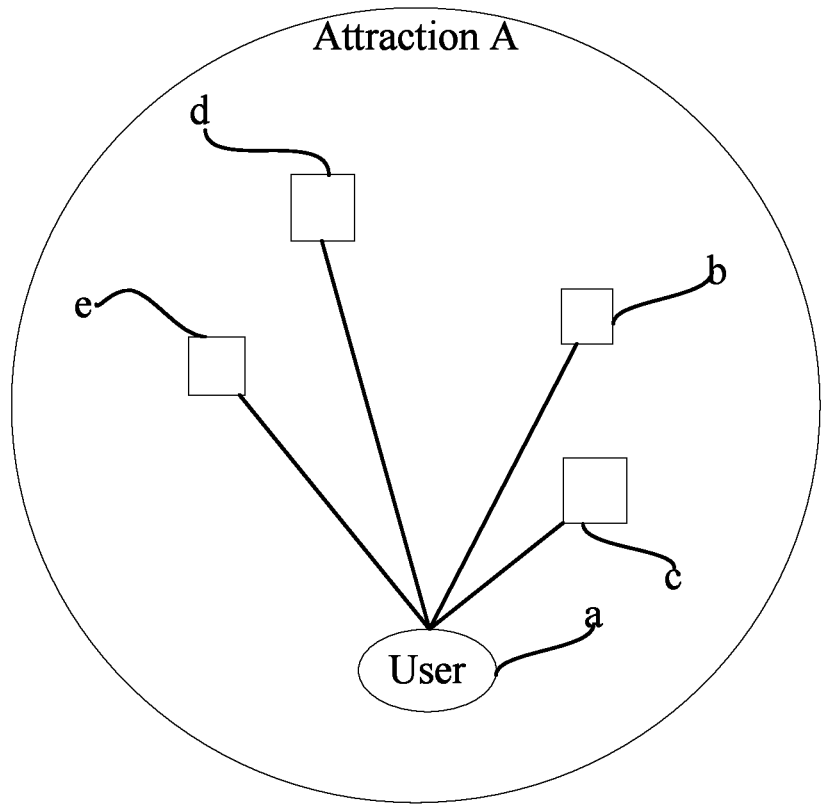
FIG. 3 is a diagram of an application scenario provided by an embodiment of the present disclosure.

FIG. 3 is a diagram of an application scenario provided by an embodiment of the present disclosure. As shown in FIG. 3, assuming that the user is currently located at position a, the attraction A has four optional geo-fences, and the four optional geo-fences can be four observation areas of the attraction A or four entrances of the attraction A (for example, gates), which are b, c, d and e respectively, and the shortest distances between the position a (where the user is currently located) and the four optional geo-fences b, c, d, and e of the attractions A are $\|a\text{-}b\|$, $\|a\text{-}c\|$, $\|a\text{-}d\|$ and $\|a\text{-}e\|$ respectively, and assuming that among $\|a\text{-}b\|$, $\|a\text{-}c\|$, $\|a\text{-}d\|$ and $\|a\text{-}e\|$, the $\|a\text{-}c\|$ is the minimum value, then the optional geo-fence c will be taken as the pre-recommended geo-fence of the attraction A.

In an implementation, after determining the pre-recommended geo-fence based on the shortest distance from the position corresponding to the positioning information to each of the optional geo-fences and the weight information of the optional geo-fences, the method of the embodiment of the present disclosure further includes: generating the guidance information for reaching the pre-recommended geofence from the position corresponding to the positioning information, based on the shortest distance from the position corresponding to the positioning information to the pre-recommended geo-fence, and the guidance information may be walking navigation information.

Figure 4:
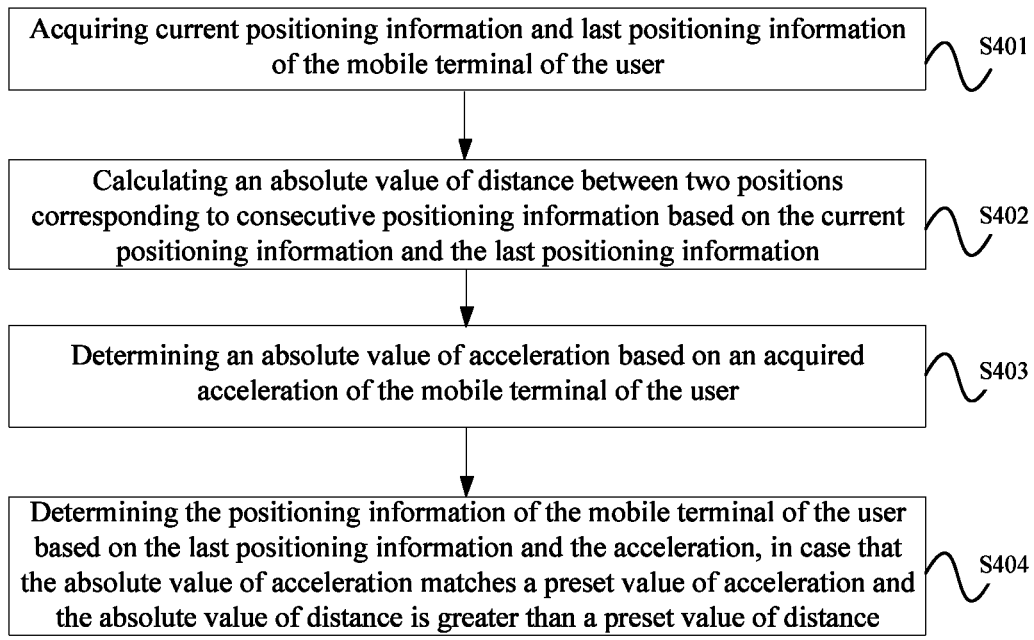
FIG. 4 is a flowchart of an information recommendation method provided by another embodiment of the present disclosure.

FIG. 4 is a flowchart of an information recommendation method provided by another embodiment of the present disclosure. On the basis of the above embodiments, the information recommendation method provided by the present embodiment specifically includes the following steps:

Step 401, acquiring current positioning information and last positioning information of the mobile terminal of the user.

Specifically, when the user turns on the GPS location function on the mobile terminal, the positioning information of the user can be acquired in real time. If the current positioning information of a certain user 1 located by the GPS is G1, the last positioning information of the user 1 located by the GPS can be acquired by calling back the GPS, and the current positioning information and the last positioning information are consecutive. In an implementation, when the GPS acquires the positioning information of the user 1, the positioning information of the mobile terminal may be acquired based on identification information of the mobile terminal of the user 1 or based on account information in the map software registered by the user 1.

Step 402, calculating an absolute value of distance between two positions corresponding to consecutive positioning information based the current positioning information and the last positioning information.

For example, if the coordinate value of the current positioning information is G1 and the coordinate value of the last positioning information is G2, the absolute value of distance between two positions corresponding to consecutive positioning information is $\|G_1\text{-}G_2\|$.

Step 403, determining an absolute value of acceleration based on an acquired acceleration of the mobile terminal of the user.

In an implementation, the acceleration of mobile terminal of the user can be acquired based on an acceleration sensor installed on the mobile terminal, that is a three-axis gyroscope, or the acceleration of the mobile terminal of the user can be acquired based on a wearable device of the user, and the way of acquiring the acceleration in the present disclosure is not limited herein.

Step 404, determining the positioning information of the mobile terminal of the user based on the last positioning information and the acceleration, in case that the absolute value of acceleration matches a preset value of acceleration and the absolute value of distance is greater than a preset value of distance.

In an implementation, the acceleration preset value here can be specifically set according to the user's application scenario in the map. For example, if the navigation route selected by the user is walking, the preset value of acceleration here is a preset value of walking acceleration; if the navigation route selected by the user is riding, the acceleration preset value is a preset value of riding acceleration; and if the navigation route selected by the user is driving, the preset value of acceleration here is a preset value of vehicle acceleration.

Specifically, the current positioning information is considered to be invalid positioning information, in case that the absolute value of acceleration matches the preset value of acceleration and the absolute value of distance is greater than a preset distance value. At this time, the current positioning information of the user can be obtained through calculation based on the last positioning information and the acceleration, and returned to the GPS system, so that the GPS system can correct the current positioning information of the user to improve the accuracy of the positioning information of the user.

In an implementation, after determining the absolute value of acceleration based on the acquired acceleration of the mobile terminal of the user, the method of the present embodiment further includes: taking the current positioning information as the positioning information of the mobile terminal of the user, when the absolute value of acceleration matches the preset value of acceleration and the absolute value of distance is less than or equal to the preset value of distance. Specifically, the current positioning information is considered to be the valid positioning information, in case that the absolute value of acceleration matches the preset value of acceleration and the absolute value of distance is less than or equal to the preset value of distance. At this time, the positioning information can be directly used as the current positioning information of the user.

The embodiment of the present disclosure acquires the current positioning information and the last positioning information of the mobile terminal of the user, calculates the absolute value of distance between two positions corresponding to consecutive positioning information based on the current positioning information and the last positioning information, determines the absolute value of acceleration based on the acquired acceleration of mobile terminal of the user, and determines the positioning information of the mobile terminal of the user based on the last positioning information and the acceleration, in case that the absolute value of acceleration matches the preset value of acceleration and the absolute value of distance is greater than the preset value of distance. Due to the use of acceleration information, the coordinate points of invalid positioning information drifted in the process of a normal travel of the user can be filtered out, and the coordinate points of normal positioning information will not be filtered out in the process of a rapid movement of the user.

Figure 5:
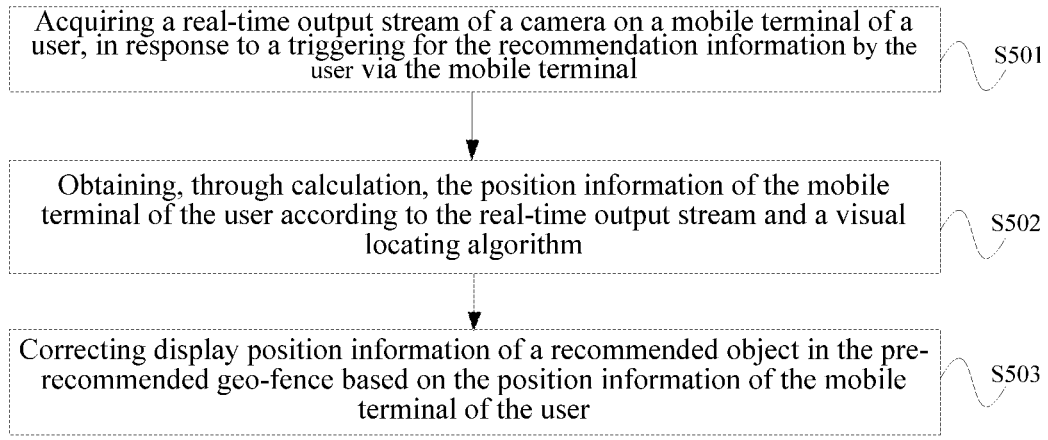
FIG. 5 is a flowchart of an information recommendation method provided by another embodiment of the present disclosure.

FIG. 5 is a flowchart of an information recommendation method provided by another embodiment of the present disclosure. On the basis that the above embodiments introduce how to guide a user into a pre-recommended geo-fence, and when the user is located in the pre-recommended geo-fence, which includes that the user himself is located in the range of the pre-recommended geo-fence or enters the range of the pre-recommended geo-fence according to the guidance information, the information recommendation method provided by the present embodiment may further include the following steps:

Step 501, acquiring a real-time output stream of a camera on a mobile terminal of the user, in response to a triggering for the recommendation information by the user via the mobile terminal.

In an implementation, after the user triggers the recommendation information via the mobile terminal, the user can enter an augmented reality (AR) scenario of the pre-recommended geo-fence. For example, by starting an AR exploration function of a map software, the user can enter the augmented reality (AR) scenario of the pre-recommended geo-fence, and the camera of the mobile terminal will have the real-time output stream after the user enters the AR scenario.

Step 502, obtaining, through calculation, the position information of the mobile terminal of the user according to the real-time output stream and a visual locating algorithm, an accuracy of the position information is greater than the accuracy of the positioning information.

In this embodiment, the visual locating algorithm refers to an algorithm for precise positioning based on a Visual Positioning System (VPS). Compared to the GPS, the VPS has a higher positioning accuracy.

For example, even though the GPS is able to provide positioning information to the user currently, but in some scenarios, such as taking a taxi or delivering food, the user needs further telephone communication to determine a more precise position to get on the car or pick up the meal, such as "get on the car at the Starbucks' door", or "pick up the meal at the gate of the community". While the VPS collects visual information for positioning through a mobile phone camera, the positioning information can be accurate to "get on the car at the Starbucks' door", or "pick up the meal at the gate of the community".

Step 503, correcting display position information of a recommended object in the pre-recommended geo-fence based on the position information of the mobile terminal of the user.

In an implementation, correcting display position information of a recommended object in the pre-recommended geo-fence based on the position information of the mobile terminal of the user, includes: converting the position information of the mobile terminal of the user into latitude and longitude coordinates; correcting the positioning information of the mobile terminal of the user based on the latitude and longitude coordinates; and correcting the display position information of the recommended object based on the corrected positioning information.

Figure 6:
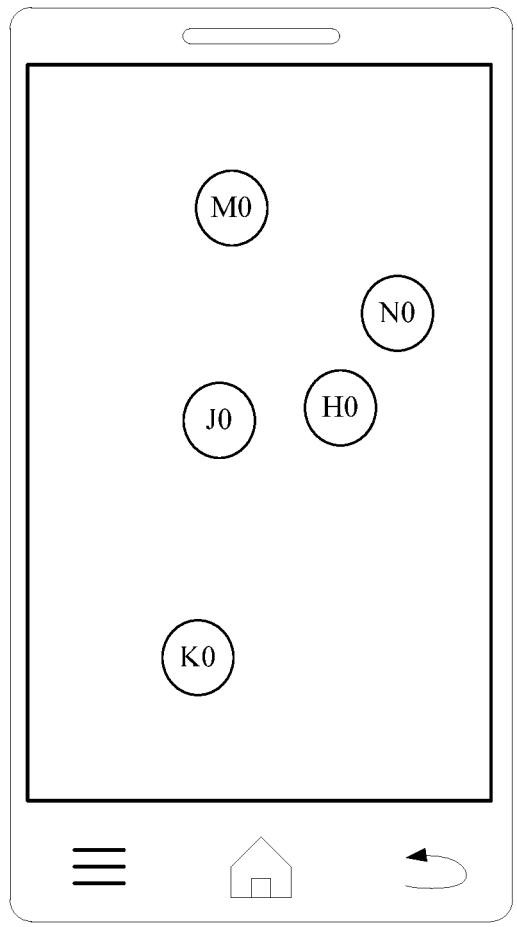
FIG. 6 is a diagram of an application scenario provided by an embodiment of the present disclosure.

FIG. 6 is a diagram of an application scenario provided by an embodiment of the disclosure, and FIG. 7 is a diagram of another application scenario corresponding to FIG. 6 provided by an embodiment of the present disclosure. As shown in FIG. 6, on a display interface of a map software, five recommended objects M, N, H, J and K are included, and their initial display positions are M0, N0, H0, J0 and K0 respectively. The initial display positions M0, N0, H0, J0 and K0 of the five recommended objects M, N, H, J and K are calculated based on the GPS positioning information of the user. In case that the pre-recommended geo-fence where the user enters supports the VPS positioning, then current VPS coordinate information of the user can be acquired through a real-time output stream of the mobile camera of the user, and then it can be converted into latitude and longitude coordinates, and the positioning information acquired through the GPS positioning can be corrected, so that the positioning accuracy of the user can reach a decimeter level of the VPS. As shown in FIG. 7, after correcting by using the VPS algorithm, final display positions of the five recommended objects M, N, H, J and K are M1, N1, H1, J1 and K1.

The embodiment of the disclosure acquires the real-time output stream of the camera on the mobile terminal of the user, in response to the triggering for the recommendation information by the user via the mobile terminal; obtains, through calculation, the position information of the mobile terminal of the user based on the real-time output stream and the visual locating algorithm, and the accuracy of the position information is greater than the accuracy of the positioning information; and corrects the display position information of the recommended object in the pre-recommended geo-fence based on the position information of the mobile terminal of the user. Because the accuracy of position information is greater than that of the positioning information, the positioning accuracy can be improved.

FIG. 8 is a flowchart of an information recommendation method provided by another embodiment of the present disclosure. On the basis of the above embodiments, the information recommendation method provided by the embodiment specifically includes the following steps:

Step 801, displaying request information for an authorization of image collection by a camera of a mobile terminal;

In an implementation, when the user is located in the pre-recommended geo-fence, the request information for the authorization of image collection by the camera of the mobile terminal can be displayed on the mobile terminal of the user. For example, when the user is located in the pre-recommended geo-fence, which includes that the user himself is located in the range of the pre-recommended geo-fence or enters the range of the pre-recommended geo-fence according to the guidance information, then a notification message will be displayed in the form of a pop-up window on the mobile terminal of the user, to request the authorization of image collection by the camera of the mobile terminal.

Step 802, acquiring the images captured by the camera, in response to passing, by the user via the mobile terminal, the authorization of image collection by the camera of the mobile terminal.

In an implementation, after the user passes, via the mobile terminal, the authorization of image collection by the camera of the mobile terminal, the images collected by the camera of the mobile terminal can be uploaded to a server, so that the server trains a user position recognition model based on the images.

Step 803, sending the images to a server such that the server trains a user position recognition model based on the images, so that the user position recognition model is capable of recognizing the current position of the user according to the images captured by the camera.

Specifically, the images are sent to the server to enable the server to recognize the current position information of the user based on the images, and train the user position recognition model based on the current position information and the images, and the user position recognition model can recognize the current position of the user according to the images captured by the camera.

In an implementation, after acquiring the images of the camera and recognizing the position information of the user, the trained user position recognition model can be optimized at regular intervals, such as one week.

The embodiment of the disclosure displays the request information for the authorization of image collection by the camera of the mobile terminal, acquires the images captured by the camera in response to passing, by the user via the mobile terminal, the authorization of image collection by the camera of the mobile terminal, trains the user position recognition model based on the images, and the user position recognition model is used to recognize the current position of the user according to the images captured by the camera. Thereby, the problems of high cost and low efficiency of collection due to the need of manual collection of a large number of training samples in the prior art, which is time-consuming and laborious, can be avoided. The embodiment of the disclosure can acquire more abundant training samples and improve the collection efficiency through the user's authorization.

In addition, when the user position information is acquired according to the real-time output stream of the camera, the real-time output stream of the camera can also be input into the user position recognition model to enable the user position recognition model to recognize the positioning information of the user according to the real-time output stream of the camera.

The above embodiments are a series of instructions around the pre-recommended geo-fence in case that the user has already within the range of a certain pre-recommended position. Here, the embodiment of the disclosure describes how to determine the pre-recommended position. Specifically including: determining multiple pre-recommended positions based on the positioning information; generating the recommendation information of the pre-recommended position, in case that the position corresponding to the positioning information falls within the range of a certain pre-recommended position. For example, if the user selects "discover surroundings" in the map software, the multiple pre-recommended positions will be determined according to the current positioning information of the user. When the current position of the user falls within a pre-recommended position, the recommendation information of the pre-recommended position will be directly generated and recommended to the user. The user can enter an AR scenario of the recommended position by triggering the recommendation information of the pre-recommended position.

In an implementation, after determining multiple pre-recommended positions based on the positioning information, the method of the embodiment of the disclosure further includes: generating a second navigation information for guiding the user to the pre-recommended position, in case that the position corresponding to the positioning information does not fall within the range of the pre-recommended positions. Continue to explain the above example as an example, when the current position of the user falls within a certain pre-recommended position, then the second navigation information for guiding the user to the pre-recommended position is generated to guide the user to the pre-recommended position.

The embodiment of the disclosure provides an entrance of the pre-recommended place for the user in case that the user is within the range of the pre-recommended place; and guides the user to the pre-recommended place in case that the user is not within the range of the pre-recommended place, and then provides the entrance of the pre-recommended place for the user, so as to avoid a defect that when the recommendation information is distributed to the user, the user cannot trigger the recommendation information, because the distance between the position of the user and the pre-recommendation place is too far in the prior art, so as to achieve accurate distribution of the recommendation information.

Figure 9:
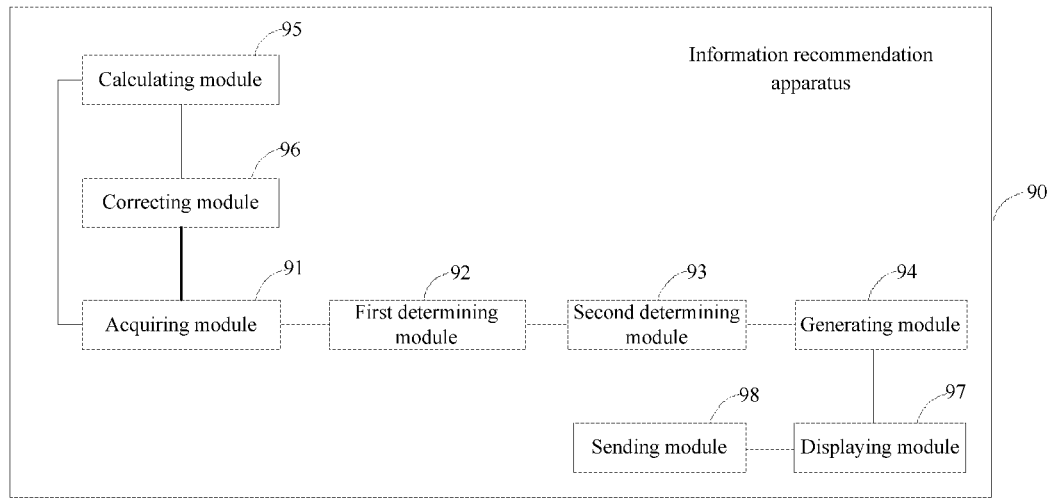
FIG. 9 is a structural diagram of an information recommendation apparatus provided by an embodiment of the present disclosure.

FIG. 9 is a structural diagram of an information recommendation apparatus provided by an embodiment of the present disclosure. The information recommendation apparatus provided by the embodiment of the disclosure can perform the processing flow provided by the embodiment of the information recommendation method. As shown in FIG. 9, the information recommendation apparatus 90 includes: an acquiring module 91, a first determining module 92, a second determining module 93 and a generating module 94; where, the acquiring module 91, configured to acquire positioning information of a mobile terminal of a user; the first determining module 92, configured to determine multiple optional geo-fences based on the positioning information; the second determining module 93, configured to determine a pre-recommended geo-fence based on the positioning information and weight information of the acquired multiple optional geo-fences; the generating module 94, configured to generate recommendation information of the pre-recommended geo-fence, in case that the position corresponding to the positioning information falls within a range of the pre-recommended geo-fence.

In an implementation, the generating module 94 is further configured to: generate guidance information for reaching the pre-recommended geo-fence from the position corresponding to the positioning information, in case that the position corresponding to the positioning information does not fall within the range of the pre-recommended geo-fence.

In an implementation, the guidance information includes first navigation information; when the generating module 94 generates the guidance information for reaching the pre-recommended geo-fence from the position corresponding to the positioning information, in case that the position corresponding to the positioning information does not fall within the range of the pre-recommended geo-fence, it is specifically configured to: generate the first navigation information for reaching the pre-recommended geo-fence from the position corresponding to the positioning information, in case that the position corresponding to the positioning information does not fall within the range of the pre-recommended geo-fence and the distance between the position corresponding to the positioning information and the pre-recommended geo-fence is greater than a distance threshold.

In an implementation, the guidance information includes instruction information; when the generating module 94 generates the guidance information for reaching the pre-recommended geo-fence from the position corresponding to the positioning information, in case that the position corresponding to the positioning information does not fall within the range of the pre-recommended geo-fence, it is specifically configured to: generate the instruction information for reaching the pre-recommended geo-fence from the position corresponding to the positioning information, in case that the position corresponding to the positioning information does not fall within the range of the pre-recommended geo-fence and the distance between the position corresponding to the positioning information and the pre-recommended geo-fence is less than or equal to the distance threshold.

In an implementation, the weight information of the multiple optional geo-fences is determined according to popularity information and/or a favorite time period of the optional geo-fences.

In an implementation, when the second determining module 93 determines the pre-recommended geo-fence based on the positioning information and the weight information of the acquired multiple optional geo-fences, it is specifically configured to: determine the shortest distance from the position corresponding to the positioning information to each of the optional geo-fences; determine the pre-recommended geo-fence based on the shortest distance from the position corresponding to the positioning information to each of the optional geo-fences and the weight information of the optional geo-fence.

In an implementation, when the acquiring module 91 acquires the positioning information of the mobile terminal of the user, it is specifically configured to: acquire current positioning information and last positioning information of the mobile terminal of the user; calculate an absolute value of distance between the two positions corresponding to consecutive positioning information based on the current positioning information and the last positioning information; determine an absolute value of acceleration based on an acquired acceleration of the mobile terminal of the user; determine the positioning information of the mobile terminal of the user based on the last positioning information and the acceleration, in case that the absolute value of acceleration matches a preset value of acceleration and the absolute value of distance is greater than a preset value of distance.

In an implementation, the acquiring module 91 is also configured to take the current positioning information as the positioning information of the mobile terminal of the user, in case that the absolute value of acceleration matches the preset value of acceleration and the absolute value of distance is less than or equal to the preset value of distance.

In an implementation, the apparatus further includes: a calculating module 95 and a correcting module 96; the acquiring module 91, which is also configured to acquire a real-time output stream of the camera on the mobile terminal of the user, in response to a triggering for the recommendation information by the user via the mobile terminal; the calculating module 95, configured to obtain, through calculation, the position information of the mobile terminal of the user according to the real-time output stream and a visual locating algorithm, and the accuracy of the position information is greater than the accuracy of the positioning information; the correcting module 96, configured to correct display position information of a recommended object in the pre-recommended geo-fence based on the position information of the mobile terminal of the user.

In an implementation, when the correcting module 96 corrects the display position information of the recommended object in the pre-recommended geo-fence based on the position information of the mobile terminal of the user, it is specifically configured to: convert the position information of the mobile terminal of the user into the longitude and latitude coordinates; correct the positioning information of the mobile terminal of the user based on the longitude and latitude coordinates; correct the display position information of the recommended object in the pre-recommended geofence based on the corrected positioning information.

In an implementation, the apparatus further includes a displaying module 97 and a sending module 98; the displaying module 97 is configured to display request information for the authorization of image collection by the camera of the mobile terminal, and the acquired module 91 is further configured to acquire the images captured by the camera, in response to passing, by the user via the mobile terminal, the authorization of image collection by the camera of the mobile terminal; and the sending module 98 is configured to send the images to a server such that the server trains a user position recognition model based on the images, so that the user position recognition model is capable of recognizing the current position of the user according to the images captured by the camera.

In an implementation, the first determining module 92 is further configured to determine multiple pre-recommended places based on the positioning information; the generating module 94 is further configured to generate the recommendation information of the pre-recommended places, in case that the position corresponding to the positioning information falls within the range of a certain one of the pre-recommended places.

In an implementation, the generating module 94 is further configured to generate a second navigation information for guiding the user to the pre-recommended place, in case that the position corresponding to the positioning information does not fall within the range of the pre-recommended place.

The information recommendation apparatus of the embodiment shown in FIG. 9 may be configured to carry out the technical solution of the above embodiments, the implementation principle and technical effect of which are similar, and will not be repeated herein.

Figure 10:
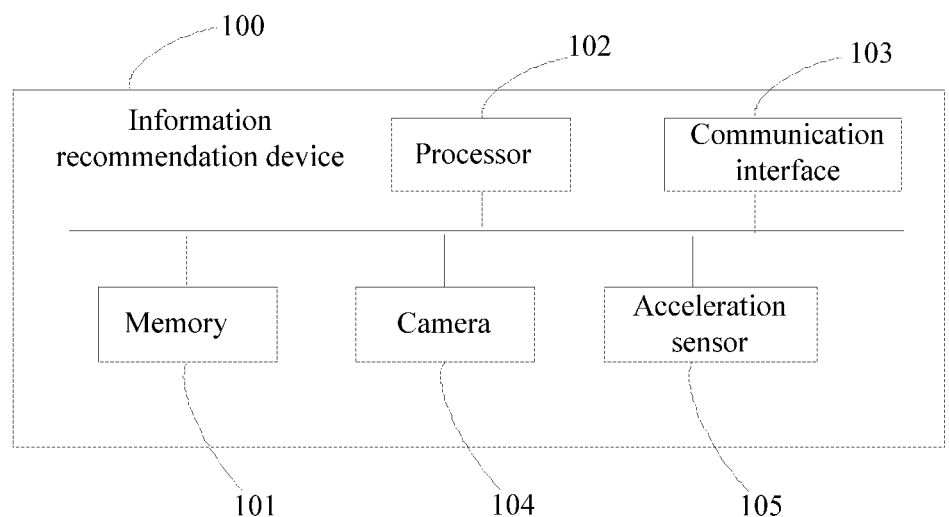
FIG. 10 is a structural diagram of an information recommendation device provided by an embodiment of the present disclosure.

FIG. 10 is a structural diagram of an information recommendation device provided by an embodiment of the present disclosure. The information recommendation device provided by the embodiment of the disclosure can perform the processing flow provided by the embodiment of the information recommendation method. As shown in FIG. 10, the information recommendation device 100 includes: a memory 101, one or more processors 102, a communication interface 103, a camera 104 and an acceleration sensor 105, where the memory 101 is configured to store one or more programs, the camera 104 is configured to collect images, the acceleration sensor 105 is configured to collect the acceleration; the computer program is stored in the memory 101 and is configured to be executed by one or more processors 102 to perform the technical solution of the above method embodiment.

The information recommendation device of the embodiment shown in FIG. 10 can be configured to carry out the technical solution of the above method embodiments, the implementation principle and technical effect are similar, and will not be repeated herein.

In addition, the embodiment of the present disclosure also provides a computer-readable storage medium, on which a computer program is stored, and the computer program is executed by the processor to implement the information recommendation method in the above embodiment.

In several embodiments provided by the present disclosure, it should be understood that the disclosed apparatus and method can be implemented in other ways. For example, the apparatus embodiment described above is only schematic, such as the division of the unit is only a logical function division, and there may be another division manner in an actual implementation, for example, multiple units or components can be combined or integrated into another system, or some features can be ignored or not implemented. On the other hand, a mutual coupling or a direct coupling or a communication connection shown or discussed herein can be an indirect coupling or the communication connection through some interfaces, apparatuses or units, and it can be electric, mechanical or other forms.

The unit illustrated as a separation part may or may not be physically separated, and the component displayed as the unit may or may not be a physical unit, that is, it may be located in one place, or it may be distributed to multiple network units. Some or all of the units can be selected according to the actual requirement to achieve the purpose of the embodiment.

In addition, each functional unit in respective embodiment of the present disclosure can be integrated in one processing unit or can be physically existing independently, or two or more units can be integrated in one unit. The above integrated unit can be implemented either in the form of hardware or in the form of hardware plus a software function unit.

The integrated unit implemented in the form of the software function unit can be stored in the computer readable storage medium. The software function unit is stored in a storage medium, including a number of instructions to enable a computer device (which may be a personal computer, a server, a network device, etc.) or a processor to perform part of the steps of the method of the embodiments of the present disclosure. The aforementioned storage media includes: a U disk, a mobile hard disk, a read-only memory (ROM), a random access memory (RAM), a disk or an optical disk and other media that can store program code.

It can be clearly understood by those skilled in the art that, for the convenience and simplicity of description, only the above division of the functional modules is illustrated as examples. In practical application, the above functional allocation can be completed by different functional modules according to requirements, that is, an internal structure of the apparatus can be divided into different functional modules to complete all or part of the above functions. A specific working process of the above apparatus can refer to the corresponding process in the aforementioned method embodiment, and will not be elaborate herein.

Finally, it should be noted that the above respective embodiment is only used to explain the technical solution of the present disclosure, not to limit it; although the disclosure has been described in detail with reference to the above embodiments, those skilled in the art should understand that they can still modify the technical solutions recorded in the above embodiments, or equivalent replace some or all of the technical features. These modifications or replacements do not separate the essence of the corresponding technical solutions from the scope of technical solutions of the embodiments of the present disclosure.

What is claimed is:

1. An information recommendation method, comprising:
    acquiring positioning information of a mobile terminal of a user;
    determining multiple optional geo-fences based on the positioning information;
    determining a pre-recommended geo-fence based on the positioning information and weight information of the acquired multiple optional geo-fences; and
    generating recommendation information of the pre-recommended geo-fence, in case that a position corresponding to the positioning information falls within a range of the pre-recommended geo-fence;
    wherein after the determining a pre-recommended geo-fence based on the positioning information and weight information of the acquired multiple optional geo-fences, the method further comprises:
    generating first navigation information for reaching the pre-recommended geo-fence from the position corresponding to the positioning information, in case that the position corresponding to the positioning information does not fall within the range of the pre-recommended geo-fence and a distance between the position corresponding to the positioning information and the pre-recommended geo-fence is greater than a distance threshold.

2. The method according to claim 1, method further comprises:
    generating instruction information for reaching the pre-recommended geo-fence from the position corresponding to the positioning information, in case that the position corresponding to the positioning information does not fall within the range of the pre-recommended geo-fence and a distance between the position corresponding to the positioning information and the pre-recommended geo-fence is less than or equal to the distance threshold.

3. The method according to claim 1, wherein the weight information of the optional geo-fences is determined according to popularity information and/or a favorite time period of the optional geo-fences.

4. The method according to claim 1, wherein the determining a pre-recommended geo-fence based on the positioning information and the weight information of the acquired multiple optional geo-fences, comprises:
    determining a shortest distance from the position corresponding to the positioning information to each of the optional geo-fences; and
    determining the pre-recommended geo-fence based on the shortest distance from the position corresponding to the positioning information to each of the optional geo-fences and the weight information of the optional geo-fences.

5. A non-volatile computer-readable storage medium which stores a computer program, wherein the computer program implements the method according to claim 1 when executed by a processor.

6. An information recommendation apparatus, comprising:
one or more processors;
a memory, configured to store one or more programs;
a camera, configured to collect images;
an acceleration sensor, configured to collect an acceleration;
when the one or more programs are executed by the one or more processors, the one or more processors are configured to:
acquire positioning information of a mobile terminal of a user;
determine multiple optional geo-fences based on the positioning information;
determine a pre-recommended geo-fence based on the positioning information and weight information of the acquired multiple optional geo-fences;
generate recommendation information of the pre-recommended geo-fence, in case that a position corresponding to the positioning information falls within a range of the pre-recommended geo-fence;
wherein the one or more processors are further configured to: generate first navigation information for reaching the pre-recommended geo-fence from the position corresponding to the positioning information, in case that the position corresponding to the positioning information does not fall within the range of the pre-recommended geo-fence and a distance between the position corresponding to the positioning information and the pre-recommended geo-fence is greater than a distance threshold.

7. The apparatus according to claim 6, wherein
the one or more processors are further configured to:
generate instruction information for reaching the pre-recommended geo-fence from the position corresponding to the positioning information, in case that the position corresponding to the positioning information does not fall within the range of the pre-recommended geo-fence and a distance between the position corresponding to the positioning information and the pre-recommended geo-fence is less than or equal to the distance threshold.

8. The apparatus according to claim 6, wherein the weight information of the optional geo-fences is determined according to popularity information and/or a favorite time period of the optional geo-fences.

9. The apparatus according to claim 6, wherein when the one or more processors determine the pre-recommended geo-fence based on the positioning information and the weight information of the acquired multiple optional geo-fences, they are further configured to:
determine a shortest distance from the position corresponding to the positioning information to each of the optional geo-fences;
determine the pre-recommended geo-fence based on the shortest distance from the position corresponding to the positioning information to each of the optional geo-fences and the weight information of the optional geo-fences.

10. The apparatus according to claim 6, wherein when the one or more processors acquire the positioning information of the mobile terminal of the user, they are further configured to:
acquire current positioning information and last positioning information of the mobile terminal of the user;
calculate an absolute value of distance between two positions corresponding to consecutive positioning information based on the current positioning information and the last positioning information;
determine an absolute value of acceleration based on an acquired acceleration of the mobile terminal of the user;
determine the positioning information of the mobile terminal of the user based on the last positioning information and the acceleration, in case that the absolute value of acceleration matches a preset value of acceleration and the absolute value of distance is greater than a preset value of distance.

11. The apparatus according to claim 10, wherein the one or more processors are further configured to take the current positioning information as the positioning information of the mobile terminal of the user, in case that the absolute value of acceleration matches the preset value of acceleration and the absolute value of distance is less than or equal to the preset value of distance.

12. The apparatus according to claim 6, wherein the one or more processors are further configured to:
acquire a real-time output stream of a camera on the mobile terminal of the user, in response to a triggering for the recommendation information by the user via the mobile terminal;
obtain, through calculation, position information of the mobile terminal of the user according to the real-time output stream and a visual locating algorithm, wherein an accuracy of the position information is greater than the accuracy of the positioning information;
correct display position information of a recommended object in the pre-recommended geo-fence based on the position information of the mobile terminal of the user.

13. The apparatus according to claim 12, wherein when the one or more processors correct the display position information of the recommended object in the pre-recommended geo-fence based on the position information of the mobile terminal of the user, they are further configured to:
convert the position information of the mobile terminal of the user into latitude and longitude coordinates;
correct the positioning information of the mobile terminal of the user based on the latitude and longitude coordinates;
correct the display position information of the recommended object in the pre-recommended geo-fence based on the corrected positioning information.

14. The apparatus according to claim 6, wherein the one or more processors are further configured to:
display request information for an authorization of image collection by a camera of the mobile terminal;
acquire images captured by the camera, in response to passing, by the user via the mobile terminal, the authorization of image collection by the camera of the mobile terminal;
send the images to a server such that the server trains a user position recognition model based on the images, so that the user position recognition model is capable of recognizing a current position of the user according to the images captured by the camera.

15. The apparatus according to claim 6, wherein the one or more processors are further configured to:
determine multiple pre-recommended places based on the positioning information;

generate recommendation information of the pre-recommended places, in case that the position corresponding to the positioning information falls within the range of a certain one of the pre-recommended places.

16. The apparatus according to claim 15, wherein the one or more processors are further configured to generate a second navigation information for guiding the user to the pre-recommended place, in case that the position corresponding to the positioning information does not fall within the range of the pre-recommended place.

* * * * *